No. 813,899. PATENTED FEB. 27, 1906.
A. T. KEENE.
KETTLE.
APPLICATION FILED MAR. 7, 1905.
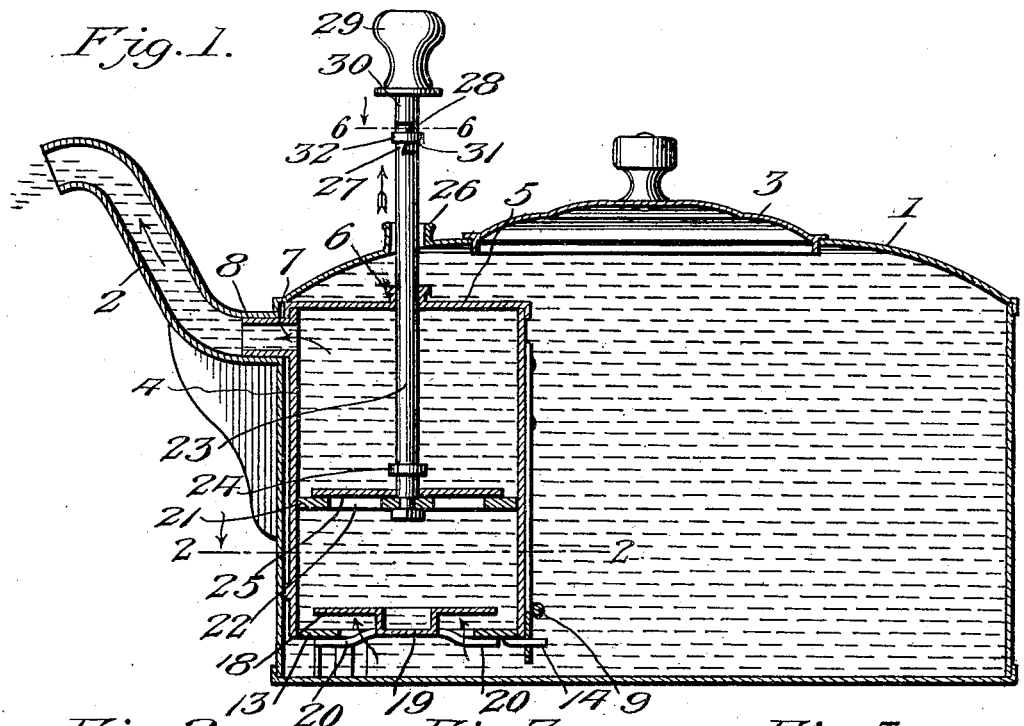
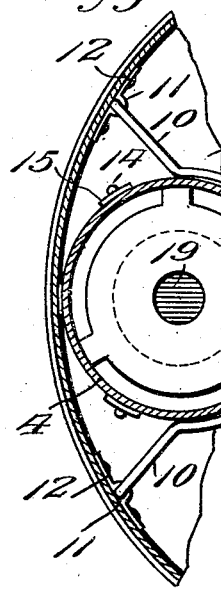
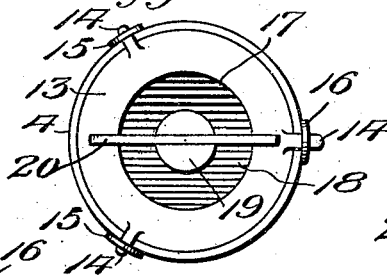
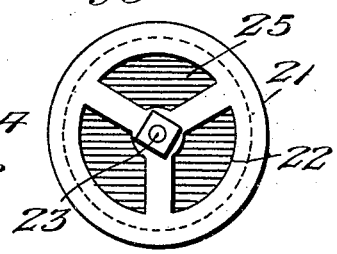
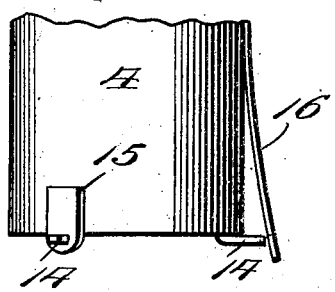
Witnesses
Edwin G. McKee
D. W. Gould
Inventor
A. T. Keene
By Victor J. Evans
Attorney

UNITED STATES PATENT OFFICE.

ARCHIBALD T. KEENE, OF PEORIA, ILLINOIS.

KETTLE.

No. 813,899.　　　Specification of Letters Patent.　　　Patented Feb. 27, 1906.

Application filed March 7, 1905. Serial No. 248,901.

*To all whom it may concern:*

Be it known that I, ARCHIBALD T. KEENE, a citizen of the United States, residing at Peoria, in the county of Peoria and State of Illinois, have invented new and useful Improvements in Kettles, of which the following is a specification.

The invention relates to an improvement in tea-kettles, and comprehends, specifically, a pumping mechanism arranged within the kettle and in connection with the spout, in the operation of which mechanism any desired quantity of water may be withdrawn from the kettle without the necessity of the usual lifting and pouring operation.

The main object of the invention is to provide a kettle arranged to obviate the usual lifting and pouring therefrom when but a small quantity of water is desired.

Another object of the invention is to construct the pumping mechanism of few parts, whereby complication is avoided and a possibility of disarrangement of the parts greatly obviated.

The details of the structure of my invention will be fully described in the following specification, with reference to the accompanying drawings, wherein—

Figure 1 is a vertical section showing my improved structure in operative position in a tea-kettle. Fig. 2 is a sectional view on the line 2 2 of Fig. 1. Fig. 3 is a bottom plan of the pumping apparatus. Fig. 4 is a broken elevation of the pumping apparatus, showing particularly the connection of the movable bottom of the cylinder. Fig. 5 is a bottom plan of the piston, and Fig. 6 is a sectional view on the line 6 6 of Fig. 1.

Referring to the drawings, my improved structure is designed for use with the ordinary tea-kettle, comprising a body 1, a spout 2, and a movable cover 3, all of which parts may be of any preferred or usual construction.

My pumping apparatus for use in connection with the pumping of the kettle is designed to be removably secured within the kettle-body and comprises a cylinder 4, having a closed top 5, in which is formed a suitable piston-stem opening 6. The casing is provided with an opening 7 near the upper end thereof, a tubular casing 8 communicating with this opening and being of a shape and size to fit snugly within the inlet end of the kettle-spout 2, whereby the pumping-cylinder within the kettle is supported. A resilient retaining-band 9 partially encircles the lower portion of the casing, having angularly-projecting portion 10 with downwardly-turned ends 11 to fit within socket-pieces 12, secured to the kettle-body, by which structure the lower portion of the pumping-cylinder is removably maintained in fixed relation with the kettle-body. The cylinder is open at the bottom to permit the insertion of the operating parts, which parts are retained in position by an annular member 13, fitting within the lower edge of the cylinder-wall and having radiating lugs 14, preferably three in number, two of which are designed to be seated in openings formed in ears 15, projecting downwardly from the cylinder, while the third lug is arranged for engagement with an opening in the lower projecting end of the spring member 16, secured to the cylinder. By this construction the annular member may be readily inserted in place or removed when desired, as will be evident. The central opening 17 of the annular member is arranged to be normally closed by a valve 18, comprising a plate of greater diameter than the opening 17 in the annular member and centrally formed with a cup-shaped depression to provide a depending guide 19, the latter being of a depth to project below the annular member when the plate of the valve 18 is seated upon said member and being of considerably less diameter than the diameter of the opening 17. Arms 20 project from the guide-flange 19 and are of a length to extend beyond the opening 17 and underlying the annular member 13. By this construction the valve 18 is permitted a vertical play equal to the depth of the guide-flange 19, for the purpose hereinafter stated.

The piston-valve comprises a valve plate or seat 21, snugly fitting within the cylinder 4 and formed with radially-arranged openings 22. A valve-stem 23 is secured centrally of the valve-plate 21 and a short distance above said plate is provided with an annular plate or collar 24. Intermediate the collar 24 and the valve-plate 21 is the valve proper, 25, comprising an ordinary flat plate of suitable material and of a size to cover the openings 22 when resting upon the plate 21. The valve is slidably mounted upon the valve-stem 23 and is limited in its upward movement by the annular stop 24. The valve-stem 23 projects through the opening 6 in the cylindertop 5 and through a walled opening 26, formed in the kettle-top. The upper end of the valve-stem is cut away to provide a projecting tongue 27, the inner edge of which is inclined, as at 28. An operating-handle 29 has a depending stud member 30 formed on its lower end, with a tongue 31 in exact duplicate of the tongue 27 of the stem, the construction being such that when the tongues 31 and 27 are arranged as illustrated the stud 30 forms a continuation of the valve-stem 23. A friction-ring 32 is arranged to encircle the joint between the stud 30 and the valve-stem 23, which permits ready operation of the valve from the handle.

Assuming the parts arranged and constructed as before described and the kettle filled with water, in which event, of course, the pump-cylinder is filled with water, the operation of the apparatus is as follows: The valve-plate 21 is normally in its lowered position, and when it is desired to secure any quantity of water from the kettle the valve-stem is drawn upon to raise the valve within the cylinder, which operates to seat the valve 25 against the plate 21, covering the opening 22 therein and lifting the quantity of water which has passed the valve and forcing the same through the kettle, this operation of the piston-valve creating a vacuum behind it and causing the water in the kettle proper to move upward the valve 18 to the limit of its movement and permit the inlet of water through the opening 17 in the annular member 13, thus filling the space below the piston-valve. On a return movement of the piston the valve 25 is raised from its seat by the pressure of the water below the piston, and the pressure of the water within the cylinder closes the valve 18. The piston being again operated will discharge the water above it through the kettle-spout. It is obvious that any quantity of water desired may be obtained from the kettle by suitable operation of the piston-stem.

The structure described is of simple convenient arrangement of parts, and I wish it understood that I do not desire to limit myself particularly thereto, but deem all mechanical changes as within the spirit and scope of my invention.

Having thus described the invention, what I claim as new is—

1. The combination with a kettle, of a pump therein comprising a casing in open communication with the kettle-spout, a removable bottom for said casing, means for securing said bottom in position, a valve for said cylinder-bottom, arms connected to the valve and bearing against the cylinder-bottom for limiting the upward movement of the valve, a perforate piston movable lengthwise of the cylinder, a valve for said piston, means for limiting the upward movement of the valve, and a valve-stem connected with the piston and projecting through the kettle-top.

2. The combination with a kettle or the like, of a cylinder in open communication with the interior of the kettle, a piston within the cylinder, a projection from the cylinder engaging the interior of the kettle-spout, and a removable ring partially encircling the cylinder and removably engaging the kettle-wall.

3. The combination with a kettle or the like, of a pump therein comprising a cylinder removably secured at opposite ends to the kettle, said cylinder being open in communication with the kettle-spout at one end and kettle-body at the opposite end, and a piston within the cylinder and operable from without the kettle.

4. The combination with a kettle or the like, of a pump therein comprising a cylinder removably secured to the kettle, said cylinder being in open communication with the kettle-spout at one end and having valve communication with the kettle-body at the other end, a piston within the cylinder and means movable from without the kettle for operating the piston.

In testimony whereof I affix my signature in presence of two witnesses.

ARCHIBALD T. KEENE.

Witnesses:
GEO. K. BEASLEY,
JOHN B. KING.